(12) United States Patent
Bastioli et al.

(10) Patent No.: US 9,394,426 B2
(45) Date of Patent: Jul. 19, 2016

(54) VEGETABLE OIL DERIVATIVES AS EXTENDER OILS FOR ELASTOMER COMPOSITIONS

(71) Applicant: Novamont S.p.A., Novara (IT)

(72) Inventors: Catia Bastioli, Novara (IT); Luigi Capuzzi, Novara (IT); Paolo Magistrali, Novara (IT); Sebastia Gesti' Garcia, Turin (IT); Gian Tommaso Viola, Cervia (IT); Giuseppe Savini, Lugo (IT); Fabio Bacchelli, Cesenatico (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 14/601,326

(22) Filed: Jan. 21, 2015

(65) Prior Publication Data

US 2015/0158993 A1   Jun. 11, 2015

Related U.S. Application Data

(63) Continuation of application No. 13/995,775, filed as application No. PCT/EP2011/073494 on Dec. 20, 2011, now Pat. No. 8,969,454.

(30) Foreign Application Priority Data

Dec. 20, 2010  (IT) .............. MI2010A2325

(51) Int. Cl.
| | |
|---|---|
| *C08K 5/09* | (2006.01) |
| *C08K 5/11* | (2006.01) |
| *C08K 5/103* | (2006.01) |
| *C08K 5/092* | (2006.01) |
| *C08L 9/00* | (2006.01) |
| *C08K 3/04* | (2006.01) |
| *C08K 3/36* | (2006.01) |

(52) U.S. Cl.
CPC ... *C08K 5/11* (2013.01); *C08K 3/04* (2013.01); *C08K 3/36* (2013.01); *C08K 5/092* (2013.01); *C08K 5/103* (2013.01); *C08L 9/00* (2013.01)

(58) Field of Classification Search
CPC ............ C08K 5/11; C08K 3/36; C08K 5/103; C08K 3/04
USPC .......................................... 524/300
See application file for complete search history.

(56) References Cited

U.S. PATENT DOCUMENTS

| | | | |
|---|---|---|---|
| 5,011,876 A * | 4/1991 | Blythe .................. | B60C 1/0016 152/525 |
| 5,717,022 A | 2/1998 | Beckmann et al. | |
| 2007/0082991 A1* | 4/2007 | Chassagnon .......... | B29D 30/52 524/313 |
| 2009/0137705 A1 | 5/2009 | Faucon Dumont et al. | |

FOREIGN PATENT DOCUMENTS

| | | |
|---|---|---|
| CN | 101367966 A | 2/2009 |
| EP | 0367979 A1 | 5/1990 |
| EP | 0761734 A1 | 3/1997 |
| EP | 2028022 A1 | 2/2009 |
| JP | 10025420 A | 1/1998 |

OTHER PUBLICATIONS

Translation of JP10-025420, Jan. 27, 1998.

* cited by examiner

*Primary Examiner* — Hui Chin
(74) *Attorney, Agent, or Firm* — Polsinelli PC

(57) ABSTRACT

Elastomer composition comprising at least one elastomer and at least one vegetable oil derivative selected from one or more of: a. mixture of triglycerides comprising one or more of the following oligomeric structures: $R_4[OC(O)R_1C(O)OCH_2CH(OR_2)CH_2]_nOR_3$ and said mixture of triglycerides having a Numerical Average Molecular Weight (Mn) of between 800 and 10,000, b. triglycerides of one or more long chain carboxylic acids including at least one carboxylic acid containing adjacent hydroxyl groups, c. esters of polyols with at least a monocarboxylic acid and at least a dicarboxylic acid, the said esters being other than triglycerides.

20 Claims, No Drawings

VEGETABLE OIL DERIVATIVES AS EXTENDER OILS FOR ELASTOMER COMPOSITIONS

RELATED APPLICATIONS

This application is a Continuation of U.S. application Ser. No. 13/995,775 filed on Jun. 19, 2013, which is the National Phase filing under 35 U.S.C. §371 of PCT/EP2011/073494 filed on Dec. 20, 2011; and this application claims priority to Application No. MI2010A002325 filed in France on Dec. 20, 2010 under 35 U.S.C. §119; the entire contents of all are hereby incorporated by reference.

DESCRIPTION

This invention relates to elastomer compositions containing vegetable oil derivatives as extender oils.

During the processing of both synthetic and natural rubbers it is common practice to use extender oils during the compounding stage. These oils, also known as process oils, have an essentially plasticising action and make it possible to improve the workability of the rubber, reduce mixing times, minimise the quantity of heat generated and maximise the dispersion of components, at the same time as increasing the cold elasticity and flexibility of the vulcanised products without undesirable effects on the more important physical properties. Also, if used in significant quantities, such oils extend the volume of the product, reducing costs.

Typically used as extender oils are mineral oils derived from the processing of petroleum which can be classified into paraffin (aliphatic), naphthenic (cycloaliphatic) and aromatic oils. When processing elastomers, in particular for the manufacture of tyres, aromatic extracts known as DAE (Distillate Aromatic Extracts), which nevertheless contain polycyclic aromatic hydrocarbons (PAC) and in particular polyaromatic hydrocarbons (PAH), which are considered to be carcinogenic substances, are conventionally used.

A recent European directive (Directive 2005/69/EC) however restricts the polyaromatic hydrocarbons content (PAH) of extender oils and tyres. One possible solution identified is the replacement of aromatic oils with aromatic and paraffinic oils treated to reduce the polycyclics content, known respectively as TDAE (Treated Distillate Aromatic Extracts) and MES (Mild Extraction Solvates).

For example U.S. Pat. No. 6,984,687 (Goodyear) describes an elastomer composition containing 5 to 70 parts by weight (phr) of an extender oil having a glass transition temperature of between −80 and −40° C., an aromatic polycyclics content of less than 3% and a total aromatics which is in any event less than 20% by weight. Extender oils having a low PAC content described in this patent are MES and heavy naphthenic oils.

A different solution is represented by the replacement of mineral oils by oils of natural origin, in particular vegetable oils.

In elastomer formulations it is also common practice to use reinforcing materials, such as carbon black or "white" materials. These white materials, in particular the silicas, require coupling agents to be present in the formulation in order to better perform their function. These coupling agents typically comprise organosilanes.

This invention relates to elastomer compositions containing particular vegetable oil derivatives as extender oils. It has in fact been surprisingly discovered that it is possible to use the said vegetable oil derivatives as a substitute for conventional extender oils for elastomers, substantially improving some mechanical properties and maintaining other properties of the elastomer compositions substantially unchanged, with significant advantages from the economic profile too.

Some vegetable derivatives according to this invention may also make it possible to render the elastomers compatible with silicas, reducing or eliminating the use of coupling agents in the formulation.

In particular the object of this invention are elastomer compositions comprising at least one elastomer and at least one vegetable oil derivative selected from one or more of:

a. mixture of triglycerides comprising one or more of the following oligomeric structures:

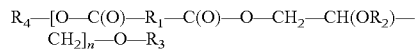

wherein
   $R_1$ is selected from $C_2$-$C_{22}$ alkylenes,
   $R_2$ is selected from one or more of the following groups consisting of $C_6$-$C_{24}$ dicarboxylic acid residues and $C_6$-$C_{24}$ monocarboxylic acid residues,
   $R_3$ is selected from one or more of the following groups consisting of H, $C_6$-$C_{24}$ dicarboxylic acid residues and $C_6$-$C_{24}$ monocarboxylic acid residues,
   $R_4$ is an alkyl group,
   n is an integer greater than or equal to 2,
   said $C_6$-$C_{24}$ dicarboxylic acid residues of $R_2$ and $R_3$ being esterified with monoalcohols and said mixture of triglycerides having a Numerical Average Molecular Weight (Mn) of between 800 and 10.000.

b. triglycerides of one or more long chain carboxylic acids including at least one carboxylic acid containing adjacent hydroxyl groups, c. esters of polyols with at least a $C_6$-$C_{24}$ monocarboxylic acid and at least a $C_6$-$C_{24}$ dicarboxylic acid, the said esters being other than triglycerides.

The invention also relates to vulcanized products obtained from said elastomeric compositions.

By the term elastomer are meant both natural rubbers (NR) and synthetic rubbers. Examples of synthetic rubbers are diene-based rubbers such as vinylarene-conjugated diene copolymers (e.g. SBR, Styrene/Butadiene Rubber), diene polymers (e.g. polybutadiene, polyisoprene), ethylene-propylene copolymers, in particular ethylene/propylene/diene terpolymers (EPDM, Ethylene/Propylene/Diene Monomer) and thermoplastic elastomers such as styrene-butadiene-styrene (SBS) block copolymers, nitrile rubbers, acrylonitrile-butadiene copolymers (NBR) and styrene-isoprene-styrene (SIS) polar rubbers.

The said elastomer may be used as such or in a mixture with other elastomers.

In a preferred embodiment of the invention the elastomer comprises polydiene rubbers or vinylarene-conjugated diene random copolymers.

Typical examples of vinylarenes are styrene and relative alkylated compounds. In a preferred embodiment, the vinylarene is styrene.

The conjugated dienes are 1,3 dienes having from 4 to 12 carbon atoms, preferably from 4 to 8 carbon atoms. Examples of these dienes are 1,3-butadiene, isoprene, 2,3-dimethyl-1,3-butadiene, 1,3-pentadiene (piperylene), 2-methyl-3-ethyl-1,3-butadiene, 1,3-octadiene. In a preferred embodiment, the conjugated diene monomers are selected from 1,3-butadiene and isoprene and mixtures thereof, preferably 1,3-butadiene.

In the following description, reference will be made to styrene as a typical vinylarene and to butadiene as a typical conjugated diene, but without limiting ourselves to these compounds.

With the term "styrene-butadiene random copolymer" is meant a styrene-butadiene copolymer wherein the content of styrene in the form of blocks (i.e. sequences of at least 10 styrene units directly linked each other), with respect to the total content of styrene, is 2% or less, as measured through the oxidative decomposition method described by I. M. Kolthoff et al. in J. Polymer Science, Vol. 1, page 429 (1946), or, more recently, by Viola et al. (Sequence distribution of styrene-butadiene copolymers by ozonolysis, high performance liquid chromatographic and gas chromatographic-mass spectrometric techniques, J. Chromatography A, 117 (1994)).

The above styrene-butadiene random copolymers preferably have a styrene content from 15 to 50% by weight, more preferably from 20 to 50% by weight.

As is known, 1,3 dienes can be bound to the polymeric chain as cis-1,4 bond (cis bond) trans-1,4 bond (trans bond), 1,2 bond (vinyl unit). In the meaning of the present invention, the content of vinyl units is defined as the ratio between the quantity of vinyl units and the sum of the cis, trans and vinyl bonds. The vinyl unit content of the diene portion of the styrene-butadiene random copolymer is preferably from 10 to 80%. The content of vinyl unit can be uniformly distributed along the polymeric chain, or it can be incremented or diminished along the chain itself.

The styrene-butadiene random elastomeric copolymer can be obtained by two different processes: from solution or as emulsion.

As far as solution processes are concerned, they are preferably performed by anionic polymerization initiated by lithium alkyls in hydrocarbon solvents. In this case the weight average molecular weight (Mw) measured by means of exclusion chromatography is between 50,000 and 1,000,000. The dispersion index value (Mw/Mn) is between 1 and 10. Preferably Mw is between 300,000 and 800,000 and Mw/Mn is between 1 and 5, more preferably between 1 and 3. The styrene-butadiene copolymers have a styrene content from 15 to 50% by weight, preferably of 20 to 45% by weight. The vinyl unit content is preferably from 10 to 80% by weight, even more preferably from 20 to 70%. The molecular structure is linear or branched, the latter being obtained by reacting the active terminals at the end of the polymerization with coupling agents such as silicon tetrachloride, tin tetrachloride, or other multi-functional coupling agents according to the known art. The Mooney viscosity of the non-oil-extended polymer $M_L(1+4)@ 100°$ C. is from 30 to 200 Mooney Units (MU), preferably from 50 to 150, whereas the corresponding polymer extended with extender oils according to the invention has a Mooney viscosity at 100° C. within the range of 30-120 MU.

As far as emulsion processes are concerned, they are preferably performed by radicalic polymerization. In this case, a branched structure is obtained due to molecular chain transfer reactions during the propagation step. The amount of styrene is preferably between 20 and 50% by weight, while the amount of vinyl units is between 15 and 25% depending on the temperature during the synthesis reaction. The polymer extended with extender oils according to the invention has a Mooney viscosity at 100° C. between 30-120.

The vegetable oils derivatives according to this invention are characterised by relatively low molecular weight. Preferably the average molecular weight is less than 10000 g/mol.

The said vegetable oil derivatives are also characterised by high stability to thermal oxidation and high stability to hydrolysis.

With reference to group a) of vegetable oil derivatives according to this invention, it is preferred that $R_1$ is a $C_6$-$C_{11}$ alkylene, $C_6$, $C_7$ and/or $C_{11}$ alkylene being particularly preferred. The two or more $R_1$ in the structure can be different from each other.

$R_2$ represents $C_6$-$C_{24}$ dicarboxylic acid residues or $C_6$-$C_{24}$ monocarboxylic acid residues or a mixture thereof. The two or more $R_2$ in the structure can be different from each other.

$R_3$ represents a $C_6$-$C_{24}$ dicarboxylic acid residue or a $C_6$-$C_{24}$ monocarboxylic acid residue.

When $R_2$ and/or $R_3$ represents $C_6$-$C_{24}$ dicarboxylic acid residues, the free acid groups of $C_6$-$C_{24}$ dicarboxylic acid residues are esterified with linear or branched $C_1$-$C_{12}$ monoalcohols.

Short chain alcohols such as for example methyl alcohol, ethyl alcohol, propyl alcohol and butyl alcohol are particularly preferred. Ethyl alcohol and butyl alcohol are particularly advantageous.

$R_4$ is preferably a linear or branched $C_1$-$C_{12}$ alkyl group, more preferably a $C_2$ or a $C_4$ alkyl group.

For the group a) of vegetable oil derivatives, by $C_6$-$C_{24}$ dicarboxylic acids are meant aliphatic diacids, preferably of the alpha-omega type. Suberic acid, azelaic acid and brassylic acids and their mixtures are particularly preferred.

For the group a) of vegetable oil derivatives, by $C_6$-$C_{24}$ monocarboxylic acid are meant monoacids possibly having one or more unsaturations along the chain and being unsubstituted or substituted.

Preferred unsubstituted monocarboxylic acids are mono acids having a chain length of $C_{9-24}$, palmitic, stearic, oleic, arachic, behenic and lignoceric acids being particularly preferred.

With reference to substituted monocarboxylic acids, long chain monocarboxylic acids with one or more keto groups or hydroxyl groups in a non-terminal position are preferred, among these $C_{12}$-$C_{24}$ carboxylic acids containing at least a ketone group or $C_{12}$-$C_{24}$ hydroxy acids containing at least one secondary hydroxyl group are particularly preferred. Examples of preferred substituted monocarboxylic acids are 9-hydroxystearic acid, 9-ketostearic acid, 10-ketostearic acid and 10-hydroxystearic acid.

Said substituted monocarboxylic acids may have two adjacent hydroxyl groups or an hydroxyl group adjacent to a keto group. If two adjacent hydroxyl groups are present, dihydroxypalmitic, dihydroxystearic, dihydroxyoleic, dihydroxyarachic and dihydroxybehenic acids are preferred. 9,10-dihydroxystearic acid is particularly preferred.

Advantageously, the group a) of vegetable oil derivatives are dimer or trimer esters of triglycerides having a number of repeating units (n) equal to 2 or equal to 3.

Particularly preferred are dimer and trimer esters of triglycerides containing $C_6$-$C_{24}$ dicarboxylic acid residues. Example of preferred dimer and trimer esters are represented by the following structures:

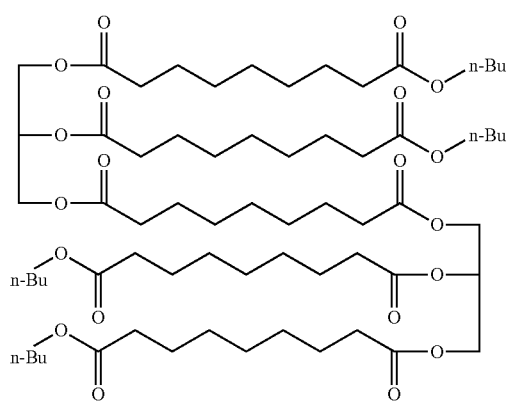
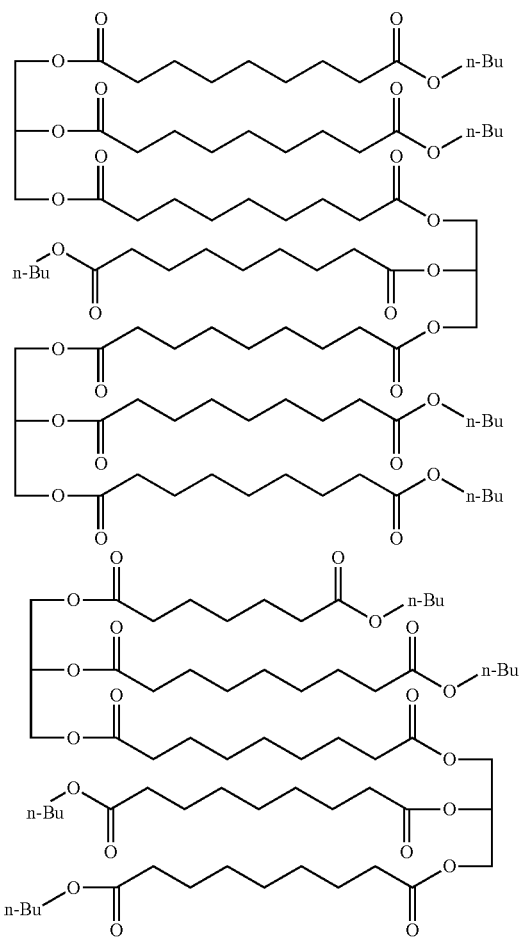
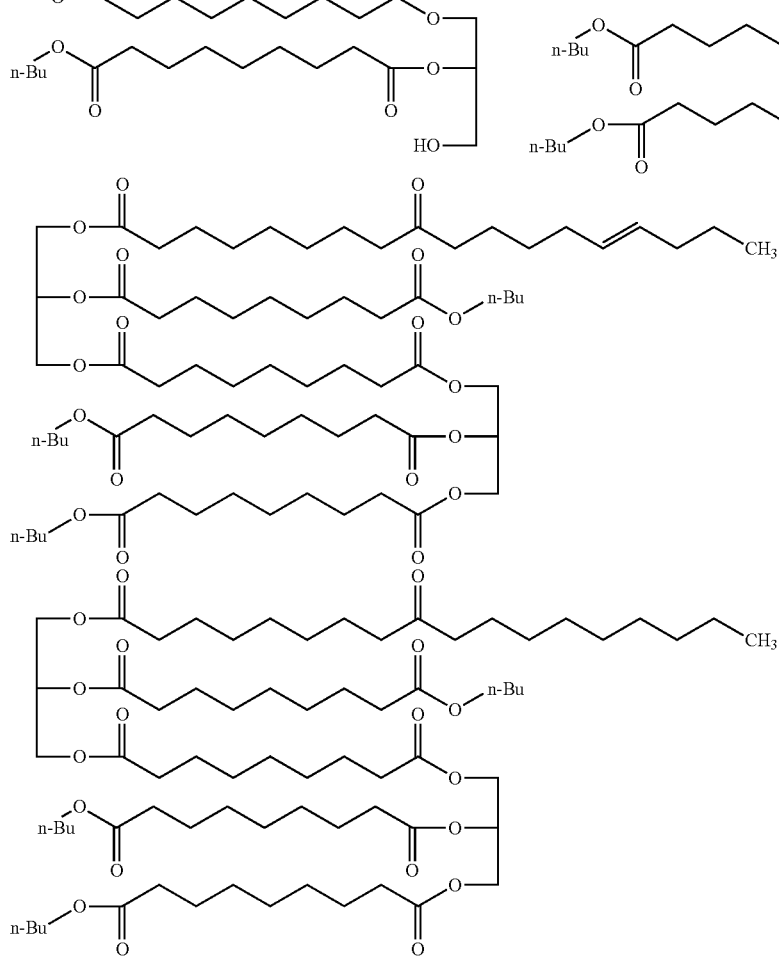

Other examples of oligomeric structures have $R_1=C_7$ alkylene, $R_4=C_4$ alkyl and $n=2$ and $R_2$ and $R_3$ independently selected from the following groups:

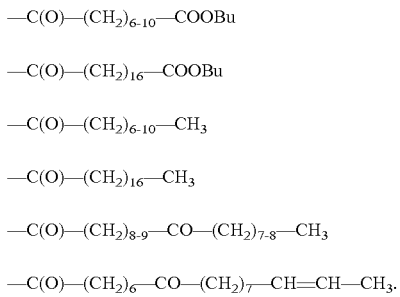

$$—C(O)—(CH_2)_{6\text{-}10}—COOBu$$

$$—C(O)—(CH_2)_{16}—COOBu$$

$$—C(O)—(CH_2)_{6\text{-}10}—CH_3$$

$$—C(O)—(CH_2)_{16}—CH_3$$

$$—C(O)—(CH_2)_{8\text{-}9}—CO—(CH_2)_{7\text{-}8}—CH_3$$

$$—C(O)—(CH_2)_6—CO—(CH_2)_7—CH=CH—CH_3.$$

The group a) of vegetable oil derivatives may possibly contain monomeric triglycerides containing at least a $C_6$-$C_{24}$ dicarboxylic acid residue. Monomeric triglycerides containing two $C_6$-$C_{24}$ dicarboxylic acids residues, said dicarboxylic acids being the same or different, are particularly preferred. Also preferred are monomeric triglycerides containing at least a $C_6$-$C_{24}$ dicarboxylic acids residue and at least a $C_6$-$C_{24}$ monocarboxylic acids residue having at least a keto group and/or at least an hydroxyl group.

Preferably, the group a) of vegetable oil derivatives further contains oligoglycerols such as diglycerol and triglycerol and their esters with mono- or dicarboxylic acids. Preferred are esters of diglycerols and triglycerols comprising one or more $C_6$-$C_{24}$ dicarboxylic acids. Also preferred are esters of diglycerols and triglycerols comprising at least a saturated or unsaturated monocarboxylic acid containing one or more hydroxyl group and/or a keto group.

The mixture of triglycerides comprising one or more oligomeric structures of group a) of vegetable oil derivatives preferably has a Mn between 800 and 10000 Da, a kinematic viscosity at 100° C. between 5 and 400 cSt and a Tg between −85° C. and −40° C., preferably between −80° C. and −50° C. and more preferably between −78° C. and −60° C.

Numerical Average Molecular Weight (Mn) is determined by GPC analysis following prior calibration with polystyrene standards.

Kinematic viscosity is calculated as the ratio of dynamic viscosity (measured with a HAAKE VT 500 rotational viscosimeter provided with MV1 rotor at 100° C.) and density.

Tg is determined by Differential Scannig calorimetry with a single run starting from −100° C. up to 30° C. at a temperature speed of 20° C./min.

Said mixture of triglycerides preferably have a density, determined by weighing 100 mL of said mixture at 100° C., between 0.90 and 1.05 g/cm³ (T=100° C.).

Advantageously, the acid number of said mixture is below 50, preferably below 10 and more preferably below 5 mg KOH/g. By acid number is meant the quantity of KOH expressed in mg used to neutralise the acidity of 1 g of substance. The determination is performed according to standard ASTM D974-07 in the presence of phenolphthalein.

The degree of unsaturation of said mixture, expressed by the $I_2$ number and determined by titration according to the Wijs method, is preferably between 0 and 140 g $I_2$/100 g.

The saponification number of the triglycerides mixture, understood to be the quantity of KOH expressed in mg consumed in the saponification of 1 gram of substance, is preferably between 150 and 500 mg KOH/g. It is determined by titration with HCl, in the presence of phenolphthalein, of the residual KOH after reflux saponification for 60 minutes.

The hydroxyl number is of the triglycerides mixture is preferably between 10 and 100 mg KOH/g.

The mixture of triglycerides is insoluble in boiling water. Said mixture is however completely soluble in diethylether, ethyl alcohol, acetone and chloroform at ambient temperature. It is also characterised by high stability to hydrolysis.

The mixture of triglycerides comprising one or more oligomeric structures of group a) of vegetable oil derivatives can be prepared as disclosed in the Italian patent application MI2010A002324 and in the International patent application having title "Complex oligomeric structures" (PCT/EP2011/073492) claiming its priority, the content of said patent applications being herein incorporated by reference.

With reference to group b) of vegetable oil derivatives according to this invention (triglycerides of one or more long-chain carboxylic acids of which at least one carboxylic acid contains adjacent hydroxyl groups), the product of the partial or total oxidation of vegetable oils with $H_2O_2$ is particularly preferred. By way of example, the derivatives obtained according to the processes described in patent applications WO/2008138892 and MI2009A002360 are considered. Derivatives of sunflower and in particular sunflower oil having a high oleic acid content (HOSO) are of particular interest.

With reference to group c) of vegetable oil derivatives according to this invention (esters, other than triglycerides, of polyols with at least a monocarboxylic acid and at least a dicarboxylic acid), by polyols are meant alcohols containing at least two hydroxyl groups. Particularly preferred are polyols such as neopentylglycol, trimethylpropane and pentaerythritol, and in any event polyols containing only primary hydroxyl groups. Advantageously the said esters contain monocarboxylic and dicarboxylic acids in ratios of preferably between 2:1 and 10:1. Preferably the monocarboxylic acids have $C_8$-$C_{24}$ chains; the dicarboxylic acids have $C_6$-$C_{24}$ chains.

The vegetable oil derivatives according to this invention may be used as extender oils for elastomers as such or in a mixture with mineral and/or natural oils. Said mixtures preferably contain 15-45% by weight of vegetable oil derivatives. The mineral oil in the mixture can be of the paraffin, naphthene or aromatic type and relative mixtures. Examples of mineral oils are DAE, TDAE, MES and RAE (residual aromatic extract). By natural oils are meant all oils not derived from petroleum, of animal origin (for example whale oil and fish oil) and of plant origin.

Among natural oils vegetable oils such as for example peanut oils, Brassicaceae oils, hemp oils, safflower oils, coconut oils, sunflower oils with a various oleic content, jatropha oils, linseed oils, olive oils, macadamia oils, mahua oils, neem oils, palm oils, poppy oils, pongamia oils, castor oils, rice oils, rubber tree seed oils (*Hevea brasiliensis*), maize seed oils, mustard oils, sesame oils and grape seed oils are preferred.

The extender oils may be present in the elastomeric composition in a quantity ranging from 5 to 75 parts of oil per 100 parts of rubber, preferably from 7 to 50 and even more preferably from 10 to 40 parts of oil per 100 parts of rubber.

According to one embodiment of the present invention, the extender oil is added during the industrial preparation of the elastomer. For example, in the case of elastomeric copolymers obtained by solution anionic polymerization, the extender oil can be fed in the polymer solution, preferably followed by additives such as antioxidants. Advantageously, at the end of the solution anionic polymerization the solvent is removed by steam in a steam agitated and heated bath. In the case of elastomeric copolymers obtained by radical polymerization, extender oils can be advantageously fed in the water emulsion, preferably followed by additives as usual and by the removal of solvent after coagulation due to addition of sulphuric acid. The rubber is then dried using either mechanical press or drying ovens and finally formed into bales.

According to another embodiment, the extender oil is added during the compounding stage.

In addition to extender oil, fillers, vulcanisation agents (e.g. sulphur) and vulcanisation accelerators, activators and retardants, organic acids, antioxidants, reinforcing materials, process coadjuvants and other additives may be added to the elastomer, as known in the art.

Examples of fillers included in the elastomer composition to which this invention relates are kaolin, barytes, calcium carbonate, clay, talc, aluminium hydroxide, diatomaceous earth, aluminium sulphate, barium sulphate and magnesium, iron and lead carbonates. Examples of reinforcing materials are carbon black, silicas, activated calcium carbonate or organic compounds such as resins with a high styrene content and phenol-formaldehyde resins. Biofillers from renewable sources such as for example the starch-based complexes described in Patent EP 1127089 B1 may also be used as fillers.

With respect to carbon black, the normal carbon black used for reinforcing elastomers can be used in a quantity ranging from 10 to 150 phr, preferably from 10 to 100 phr, even more preferably from 15 to 80 phr. In a preferred embodiment, the carbon black has a specific surface area, determined by means of nitrogen absorption ranging from 40 to 200 m2/g and a DBP (dibutyl phthalate) absorption number, determined according to ASTM-D-2414 ranging from 70 to 180 ml/100 g. The carbon black is preferably in the form of small particles having a good oil absorption capacity. Even more preferably a carbon black in which —OH groups have been introduced in the surface is used, as these groups are reactive with respect to the organo-silane coupling agents.

Any type of silica can be used, for example anhydrous silica obtained by precipitation from sodium silicate, with a dimension ranging from 20 to 80 nm, a surface area of 35-250 m2/g. The quantity of silica is usually within the range of 10 to 150 phr, preferably from 15 to 120 phr.

If silicas are used, common coupling agents, typically comprising organosilanes, will be added to the elastomer compositions according to the invention. A tipical organosilane is a functionalized trialkoxysilane or dialkoxysilane. In a preferred embodiment, organosilane has one of the three general formulae (d, e, f) indicated hereunder:

$(RO)_3SiC_nH_{2n}S_mC_nH_{2n}Si(OR)_3$ (d)

$(RO)_3SiC_nH_{2n}X$ (e)

$(RO)_3SiC_nH_{2n}S_mY$ (f)

wherein R represents an alkyl group having from 1 to 4 carbon atoms, the three Rs being the same or different; "n" represents an integer from 1 to 6, "m" represents an integer from 1 to 6;

X represents a mercaptan group, an amine group, a vinyl group, a nitrous group, an imido group, a chlorine atom or epoxy group;

Y represents a cyano group, a N,N-dimethylthiocarbamoyl group, a mercaptobenzotriazole group, or a methacrylate group.

Organo-silanes having at least one sulphur atom are preferred, for their reactivity towards the rubber in the vulcanization phase. In particular organo-silanes selected from bis (3-triethoxysilylpropyl)tetrasulphide; γ-mercaptopropyl methoxysilane-3-thiocyanatepropyl triethoxysilane; trimethoxysilyl propyl mercaptbenzotriazole tetrasulphide, are preferred. The coupling agent is used in quantity usually up to 20 phr.

It should be pointed out that silica and the coupling agent, can be substituted by a compound deriving from the reaction of silane with silica. In other words, the elastomeric composition of the present invention can contain, in partial or total substitution of the silica and silane, the reaction product between silane and silica.

The coupling agents have the function of stabilising a bond of a chemical or physical nature between the elastomer and the reinforcing material, assisting dispersion of the latter and ensuring good mechanical properties for the elastomer compositions.

Surprisingly, it has been found that the elastomer compositions according to this invention containing derivative (c) as extender oil and reinforced with silica maintain good mechanical properties even in the absence of common coupling agents. This makes it possible to avoid the costs associated with silanes, making the use of vegetable oil derivatives according to the invention in elastomer compositions even more advantageous.

As far as vulcanizing agents are concerned, these are sulphur or a compound containing sulphur. Typical compounds containing sulphur are sulphur monochloride, sulphur dichloride, a disulphide, a polysulphide. The preferred vulcanizing compound is sulphur. The quantity of vulcanizing agent ranges from 0.1 to 10 phr. A vulcanization accelerator, an activator and a crosslinking agent can also be used together with the vulcanizing agent. The vulcanization accelerators include derivatives of guanidine, amino-aldehydes, ammonia-aldehydes, derivatives of thiazole, amido-sulphene compounds, thioureas, thiouram, dithiocarbamates, xanthates. Typical activators are zinc oxide and Stearic acid.

Typical examples of crosslinking agents comprise oxime derivatives, nitrous derivatives, polyamines, in addition to a radicalic initiator such as an organic peroxide and an azo-derivative.

Examples of antioxidants or anti-aging agents are derivatives of amines such as diphenylamine and p-phenylenediamine, derivatives of quinoline and hydro-quinone, monophenols, diphenols, thiobisphenols, hindered phenols, esters of phosphoric acid. These compounds, and relative mixtures, can be used within the range of 0.001 to 10 parts by weight per 100 parts of elastomeric material.

The elastomer composition according to the invention may be subsequently mixed, shaped and vulcanised according to known methods.

The elastomer composition containing vegetable oil derivatives according to this invention finds use in particular in the manufacture of tyres.

In this connection, a particularly preferred embodiment of the present invention relates to a raw elastomeric composition comprising:

(A1) from 30 to 100% by weight of a vinylarene-conjugated diene random elastomeric copolymer;
(A2) from 0 to 70% by weight, preferably from 0 to 40% by weight of one or more diene rubbers,
the total amount of elastomers (A1)+(A2) being equal to 100, and
(B) from 10 to 150 phr, preferably from 15 to 120 phr of silica or carbon black or mixtures thereof;
(C) from 10 to 100 phr, preferably from 20 to 60 phr of a vegetable oil derivative according to the present invention or their mixtures with other mineral and/or natural oils;
(D) from 0.1 to 20 phr of a coupling agent based on silane;
(E) from 0.1 to 10 phr of a vulcanizing agent.

As far as (A1) is concerned, it can be obtained either by anionic polymerization initiated by lithium alkyls in hydrocarbon solvents or by radicalic polymerization in emulsion. Advantageously the vinylarene-conjugated diene random elastomeric copolymers are styrene butadiene copolymers.

The component (A2), i.e. the diene rubber, is an elastomer selected from the group comprising natural rubber, polybutadiene, polyisoprene, styrene-butadiene copolymer, styrene-isoprene copolymer, isoprene-butadiene copolymer. If polybutadiene is used as component (A2), it is preferably selected from polybutadiene cis-1,4 and high vinyl polybutadiene (vinyl content from 40 to 90%) and relative blends. When component (A2) is polyisoprene, it is preferably a polyisoprene cis-1,4 with a cis-1,4 percentage higher than 90% by weight. The component A2 can also consist of mixtures in any proportion of synthetic polyisoprene or natural rubber with polybutadiene with high (>90%) content of 1,4-cis units.

The component (C) preferably belongs to group a) of vegetable oil derivatives according to the present invention (mixture of triglycerides comprising oligomeric structures).

The above raw elastomeric composition can be prepared by mixing components (A)-(E), and the formulation agents, using the typical equipment adopted for the mixing of elastomeric compounds, for example roll mixers, a Banbury internal mixer, extruders. The mixture is then formed and vulcanized. The mixing of the ingredients can be effected in a single step or in various passages. In this latter case, a first method consists of first mixing the elastomeric components (A1) and (A2), optionally already containing the extender oil (C), the silica and/or carbon black (B) and the coupling agent (D) and other additives in an internal mixer of the Banbury type and subsequently the vulcanizing agent (E) and accelerators in a roll mixer. In another method the silica and coupling agent are first mixed and reacted and the product of this reaction is subsequently mixed with the elastomers (A1) and (A2) and finally with the vulcanizing agent.

The present invention also encompasses, in general, rubber compounds (i.e. vulcanized products) prepared from the elastomeric compositions above disclosed.

The vulcanized products according to the present invention, particularly those containing vinylarene-conjugated diene random elastomeric copolymers and polydiene with a high cis units content, appear to be particularly suitable as tyre tread, especially for cars, due to their excellent adhesion to wet surfaces or on ice while presenting a low rolling resistance. Since the wet grip properties—or otherwise sealing properties under poor grip conditions—are usually achieved to the detriment of rolling resistance, this represents an unexpected advantage.

For example, is known that an increase in the styrene fraction of copolymers leads to increased hysteresis of the rubber with the result of an increase in adherence, but a worsening of the rolling resistance properties.

Surprisingly, it has been found that elastomeric compositions comprising styrene-butadiene random copolymers, particularly those having a high styrene content, and a vegetable oil derivative as extender oil according to the present invention allows to obtain vulcanized products with increased wet grip properties and reduced rolling resistance index with respect to elastomeric composition containing traditional extender oils.

The elastomeric compositions according to the invention will now be described by way of non-limiting examples. The examples given below are intended to highlight the benefits arising from the use of vegetable oil derivatives according to the present invention.

EXAMPLES

Examples 1-5

The dynamic-mechanical properties of elastomer compositions containing vegetable oil derivatives according to the invention (Examples 1-3) were compared with those of elastomer compositions containing extender oils derived from petroleum with a low PAC content (TDAE, Example 4) and vegetable oils as such (Example 5).

The vegetable oil derivative used in Example 1 was a sunflower oil derivative belonging to group a). For its preparation, a mixture of triglycerides containing saturated carboxylic acids having more than one acid function was obtained from the organic phase after the hydrolysis step d) at the end of the oxidative cleavage process described in the patent application MI2009A002360. The free carboxylic acids contained in the organic phase were evaporated in a thin film evaporator operating at a pressure of 5 mbar, with a temperature of diathermic oil of 270° C. and with the following operative conditions:

Temperature of the feeding=105° C.
Temperature of the vapour phase=205° C.
Temperature of the reaction residue=250° C.

Said mixture of triglycerides containing saturated carboxylic acids having more than one acid function was esterified with ethyl alcohol. The esterification reaction with ethyl alcohol, catalysed by sulphuric acid, was performed in toluene heating the reaction to reflux and removing the water formed in the course of the reaction by azeotropic distillation. The ester was purified by dilution with ether and successive washings with distilled water and aqueous sodium bicarbonate solution to remove the acid catalyst; the excess ethanol and volatile ethyl esters were then separated out by evaporation under vacuum (pressure=0.1 mbar, temperature of vapours between 60-160° C.).

TABLE 1

| Example | Extender oil |
|---|---|
| 1 | Mixture of triglycerides containing oligomeric structures esterified with ethanol (derivative a.) |
| 2 | Triglyceride containing 80% of 9,10-dihydroxystearic acid (derivative b.) |
| 3 | Bis[di(hydroxymethyl)-2,2-butanol-1] azelate tetrapelargonate (derivative c.) |
| Comparison-4 | TDAE |
| Comparison-5 | HOSO sunflower oil (82% oleic acid, 10% linoleic acid, 4.5% palmitic acid, 3.5% stearic acid). |

Five identical elastomer compositions containing SBR as the base elastomer were prepared. These compositions differ only in the compound used as extender oil (Table 1).

Table 2 shows the quantities by weight in the elastomer compositions containing the extender oils in Table 1, specifying the quantities of the individual ingredients in relation to one hundred parts of rubber (phr).

TABLE 2

Quantities by weight in the elastomer composition

| Material | phr |
|---|---|
| SBR 1502 | 100.0 |
| Precipitated silica (Zeosil 1165 MP) | 60.0 |
| Extender oil | 17.0 |
| Silane (TESPT) | 4.8 |
| Preservative (TMQ) | 1.5 |
| Activator (ZnO) | 2.6 |
| Vulcanisers (sulphur, MBTS, TBBS) | 3.8 |

The components were dispersed in the rubber using a Banbury Pomini-Farrel model PL04 mixer. After loading the rubber a 30 sec stage of mastication at a temperature of 125° C. was initiated, at a rate of 60 rpm.

First ⅓ of the silica and ⅓ of the extender oil were added, allowing them to mix for 30 sec, and then ⅓ of the silica, ⅓ of the oil and the silane were added, mixing for a further 30 sec.

The remainder of the silica, oil and preservative were successively added to the mixer, mixing for a further 30 sec.

Mixing was then continued for a maximum time of 7 minutes, in any event stopping the process at 160° C.

The mixture was discharged, cooled and reloaded into the mixer at a temperature of 140° C., mixing being continued at 60 rpm for a maximum time of 10 minutes, in any event stopping the process at 160° C.

The mixture was discharged and allowed to cool, and then again placed back in the mixer at 55° C. The activator and the vulcanisers were added and allowed to mix for 2 minutes at 60 rpm.

The mixture so obtained was vulcanised in a press at 160° C. for 10 minutes to prepare the test specimens intended for mechanical characterization.

Tensile tests in particular were performed, measuring the Ultimate Tensile Strength ($\sigma_b$), the Elongation corresponding to the Ultimate Tensile Strength ($\epsilon_b$) and Elastic Modulus with reference to an elongation of 200% ($E_{200\%}$) according to standard ASTM D412. Rebound was also tested according to standard ASTM D7121 and Shore A Hardness according to standard ASTM D2240.

As may be seen from the data shown in Table 3, all the elastomer compositions show substantially comparable Rebound and Shore Hardness properties, while the elastomer compositions according to the invention (Examples 1, 2 and 3) have a better Ultimate Tensile Strength and Elastic Modulus than the reference compositions containing TDAE and HOSO as extender oil (comparison Examples 4 and 5).

TABLE 3

Mechanical properties of the elastomer compositions

| Examples | $\sigma_b$ (MPa) | $\epsilon_b$ (%) | $E_{(200\%)}$ (MPa) | Rebound resilience (%) | Shore A |
|---|---|---|---|---|---|
| 1 | 12.2 | 374 | 2.7 | 36.2 | 38 |
| 2 | 13.5 | 391 | 2.7 | 36.1 | 62 |
| 3 | 15 | 330 | 3.4 | 36.1 | 39 |
| Comparison-4 | 8.0 | 388 | 1.7 | 36.1 | 43 |
| Comparison-5 | 10.5 | 433 | 1.5 | 36.0 | 30 |

This fact indicates a better degree of vulcanisation associated with an increase in compatibility between the extender oil according to the invention and the rubber. This makes it possible to use high quantities of extender oil in the mixture. Extension of the volume makes it possible to reduce the costs associated with the production of mixtures but also to vary properties according to the needs of specific applications.

The mixtures so obtained are particularly suitable for the manufacture of tyre treads.

Examples 6-8

Two elastomer compositions containing a derivative (c) according to the invention were prepared in the presence and absence of silane (Examples 6 and 7 respectively) and compared with an elastomer composition containing a conventional extender oil prepared without silane (comparison Example 8).

The mixtures, with the ratios indicated in Table 2, were prepared using the process indicated in the previous examples.

The compositions in Examples 6 and 7 contained derivative (c.) according to the invention in a mixture with TDAE mineral oil. The corresponding proportions by weight are shown in Table 4.

In Comparison Example 8 only TDAE was used as extender oil; the elastomer composition in Example 8 without silane can therefore be compared with that in Example 4 prepared with silane.

TABLE 4

| Example | Extender oil | Silane |
|---|---|---|
| 6 | 72% TDAE<br>28% bis[di-hydroxymethyl]-2,2-butanol-1] azelate tetrapelargonate | Yes |
| 7 | 72% TDAE<br>28% bis[di-hydroxymethyl]-2,2-butanol-1] azelate tetrapelargonate | No |
| Comparison-8 | 100% TDAE | No |

Each of the compositions were vulcanised and shaped into test specimens in accordance with the procedure described for Examples 1-5.

The dynamic-mechanical properties of these elastomer compositions in the presence and absence of silane with a coupling agent were then compared.

TABLE 5

Mechanical properties of the elastomer compositions

| Examples | $\sigma_b$ (MPa) | $\epsilon_b$ (%) | $E_{(200\%)}$ (MPa) | Shore A |
|---|---|---|---|---|
| 6 (silane) | 8.5 | 346 | 2.1 | 45 |
| 7 (no silane) | 8.1 | 561 | 1.7 | 51 |
| Comparison-4 (silane) | 8.0 | 388 | 1.7 | 43 |
| Comparison-8 (no silane) | 3.0 | 286 | 1.2 | 38 |

Looking at the data in Table 5 it will be noted that the elastomer composition according to the invention, containing a type (c.) derivative and prepared in the absence of silane (Example 7), keeps substantially unchanged mechanical properties in comparison with an identical composition prepared in the presence of silane (Example 6).

The comparison composition prepared by TDAE in the absence of silane (Example 8) instead has an Ultimate Tensile Strength and Elastic Modulus which are decidedly poorer than those of Example 4 containing silane.

This indicates that the extender oil according to the invention has a compatibilising effect in relation to the reinforcing filler. The resulting elastomer composition does not therefore require the addition of coupling agents.

Examples 9-20

In the following examples, different oil extended elastomeric compositions particularly suitable for use in the construction of tyre treads are compared.

Rubber compounds with similar glass transition temperatures (measured by DMA) based on different elastomeric compositions have been prepared in order to evaluate the tyre tread performances, with particular reference to the predictors for wet grip (WG) and rolling resistance (RR).

The elastomeric compositions used in the evaluation of said rubber compounds have been prepared from base elastomers with different styrene and vinyl content.

The vegetable oil derivative of the group a) used as extender oil in the following examples according to the invention was prepared from the same mixture of triglycerides containing saturated carboxylic acids having more than one acid function prepared in Example 1 and then esterified with butyl alcohol. The esterification reaction with butyl alcohol, catalysed by sulphuric acid, was performed heating the reaction to reflux and removing the water formed in the course of the reaction by azeotropic distillation. The product was purified by washings with distilled water and aqueous sodium bicarbonate solution to remove the acid catalyst; the excess butyl alcohol and volatile butyl esters were then separated out by evaporation under vacuum (pressure=0.1 mbar, temperature of vapours between 80-190° C.).

In the examples provided hereinafter, the following test methods were adopted:

Determination of Bound Styrene and of the Polybutadiene Microstructure:

The method is based on the calculation of the ratios between the intensity of the bands attributable to styrene and the three Butadiene isomers (trans, vinyl and cis); the spectral areas used for the analytical determination, relating to the cis, trans and 1,2 isomers of butadiene and styrene prove to be: 1018 and 937 cm$^{-1}$ for the trans isomer, 934 and 887 cm$^{-1}$ for the 1,2 isomer (to be corrected due to the interference of the styrene), 840 and 600 cm$^{-1}$ for the cis-isomer and from 715 to 680 cm$^{-1}$ for styrene. The measurement of the absorbances in the maximum points and a knowledge of the extinction coefficient values, measured on standard polymers characterized via $^1$H-NMR, allows the quantity of the various butadiene structures and the quantity of styrene to be calculated, by means of the Lambert-Beer law.

Determination of the Molecular Mass Distribution (MWD) (Limited to Polymers Obtained by Anionic Solution-Polymerization):

The determination of the molecular mass distribution is effected by means of gel permeation chromatography (GPC) also known as exclusion chromatography effected by passing a solution in THF of the polymer, object of the analysis, on a series of columns containing a solid phase consisting of crosslinked polystyrene with pores having various dimensions.

Instrumental configuration:
Chromatograph Agilent 1100
Solvent THF
Temperature 25° C.
PL-Gel Columns $10^5$-$10^5$-$10^4$-$10^3$
RI detector Agilent 1100

The determination of the molecular mass is effected according to the Universal Calibration method using the following values for k and α, in relation to the quantity of styrene:

| Styrene = 25% | k = 0.000389 | α = 0.693 |
| Styrene = 30% | k = 0.000368 | α = 0.693 |
| Styrene = 40% | k = 0.000338 | α = 0.693 |

Determination of the Presence of Sequences and Polystyrene Blocks (Limited to Solution Polymers):

The method comprises a chemical degradation of styrene/butadiene copolymers by ozonolysis of the butadiene double bonds, followed by reduction and HPLC elution of the oligomers produced, in order to obtain a quantitative evaluation of the distribution of the styrene units in random and partially random SBRs. The possibility of having a double UV-MS detector allows the quantitative determination as % AREA from the UV plot and contemporaneously a control of the molecular weights of the species eluted, to be effected.

Determination of the Mooney Viscosity:

The determination of the Mooney viscosity ($M_L$) was effected at 100° C. with a rotor L and times (1+4) according to standard ASTM D1646.

Determination of the Tensile Properties (Ultimate Elongation, Elongation to Break, Moduli):

according to ASTM D 412 as previously described.

Determination of Tg and Tyre Tread Predictors (Commonly Accepted Practice):

Glass transition temperature (Tg) was measured by dynamic mechanical measurements (DMA). Tg is defined as the temperature corresponding to the maximum of the curve of the damping factor (tan δ) versus temperature.

Tan δ measured at a temperature of 60° C., 5% deformation at a frequency of 1 Hz was used as a predictor of rolling resistance (tan δ RR); the higher Tan δ, the greater the rolling resistance. Tan δ measured at a temperature of 0° C., 0.1% deformation at a frequency of 0.1 Hz was used as a predictor of the grip when braking or in bends presented by the tread blend (tan δ WG); the higher Tan δ the better the grip. The measurement method is described in D. J. Schuring and S. Futamura, Rubber Chem. Technol. 63, 315 (1990).

As it is known, a lower tan δ at a temperature of 60° C. is desirable for a tire tread to provide a tire with good rolling resistance while a high tan δ at a temperature of 0° C. is desirable for a tire tread to provide a tire with good wet traction.

In the Examples, tan δ RR and tan δ WG values of compounds with traditional extender oils were normalized to a value of 100 for comparison purposes. The tan δ RR and tan δ WG values of compounds comprising the elastomeric composition according to the present invention were reported relative to the normalized values of 100. Values higher than 100 therefore predict a performance improvement, i.e. a lower tan δ RR or a higher tan δ WG with respect to compounds with traditional extender oils.

Example 9

Comparison. Preparation of SBR A 27.5% by weight of an extender oil of the RAE type was added to a base elastomer consisting of a styrene-butadiene copolymer obtained by emulsion polymerization with a styrene content of 23.5%. Antioxidants were added to the emulsion and then the emulsion was coagulated and dried according to the known art. The Mooney viscosity at 100° C. was 45.

Example 10

Preparation of SBR B 27.5% by weight of the extender oil of the group a. of the vegetable oil derivatives according to the invention was added to a base elastomer consisting of a styrene-butadiene copolymer obtained by emulsion polymerization with a styrene content of 40%. Antioxidants were added to the emulsion and then the emulsion was coagulated and dried according to the known art. The Mooney viscosity at 100° C. was 44.

Example 11

Preparation of SBR C 27.5% by weight of an extender oil was added to a base elastomer consisting of a styrene-butadiene copolymer obtained by emulsion polymerization with a styrene content of 23.5%. The extender oil consisted of 75% RAE mineral oil, the remaining 25% being a vegetable oil derivative belonging to the group a. according to the invention. Antioxidants were added to the emulsion and then the emulsion was coagulated and dried according to the known art. The Mooney viscosity at 100° C. was 42.

Example 12

Comparison. Preparation of SBR D 27.5% by weight of an extender oil of the TDAE type was added to a base elastomer consisting of a styrene-butadiene copolymer obtained by emulsion polymerization with a styrene content of 23.5%. Antioxidants were added to the emulsion and then the emulsion was coagulated and dried according to the known art. The Mooney viscosity at 100° C. was 39.

Example 13

Preparation of SBR E 27.5% by weight of the extender oil of the group a. of the vegetable oil derivatives according to the invention was added to a base elastomer consisting of a styrene-butadiene copolymer obtained by solution polymerization with a styrene content of 35% by weight, vinyl unit content of the diene portion of 66%, with four radial arms and molecular weight of the arm equal to 320 kD, synthesized in a batch reactor, with a coupling efficiency of 80%. Antioxidants were added to the solution, the solvent was removed and then the solution was dried according to the known art. The Mooney viscosity at 100° C. was 48.

Example 14

Comparison. Preparation of SBR F 27.5% by weight of an extender oil of the TDAE type was added to a base elastomer consisting of a styrene-butadiene copolymer obtained by solution polymerization with a styrene content of 24% by weight, vinyl unit content of the diene portion of 64%, with four radial arms and molecular weight of the arm equal to 303 kD, synthesized in a batch reactor, with a coupling efficiency of 60%. The lower coupling efficiency was deliberately obtained in order to produce a polymer having a Mooney viscosity in the same range of that of SBR E (Example 13). Antioxidants were added to the solution, the solvent was removed and then the solution was dried according to the known art. The Mooney viscosity at 100° C. was 57.

The characteristics of the styrene-butadiene copolymers as prepared in Examples 9-14 are summarized in Table 6.

TABLE 6 styrene-butadiene copolymers prepared in Examples 9-14.

| | | Base elastomer | | Extender oil | | | Mooney |
| | | Styrene | Vinyl unit | (% w of extender oil) | | | viscosity |
| Example | Sample | content (%) | content (%) | RAE | TDAE | Vegetable Oil Derivative a. | at 100° C. ($M_L$) |
| --- | --- | --- | --- | --- | --- | --- | --- |
| Comparison-9 | SBR A | 23.5 | 15.5 | 100 | — | — | 45 |
| 10 | SBR B | 40 | 16 | — | — | 100 | 44 |
| 11 | SBR C | 23.5 | 15.5 | 75 | — | 25 | 42 |
| Comparison-12 | SBR D | 23.5 | 15.5 | — | 100 | — | 39 |
| 13 | SBR E | 35 | 66 | — | — | 100 | 48 |
| Comparison-14 | SBR F | 24 | 64 | — | 100 | — | 57 |

Example 15

An elastomeric composition containing a RAE extender oil (Compound A) is compared to an elastomeric composition according to the invention (Compound B). The two elastomeric compositions comprise emulsion SBR (prepared in Examples 9-comparison and 10) with a different styrene content and carbon black.

Table 7 shows the quantities by weight in the elastomeric compositions in relation to one hundred parts of rubber (phr).

TABLE 7

| quantities by weight (phr) in the elastomeric compositions of Example 15 | | |
| Material | Compound A | Compound B |
| --- | --- | --- |
| SBR A | 100 | — |
| SBR B | — | 100 |
| HAF330 Carbon black | 50 | 50 |
| ZnO | 3 | 3 |
| Stearic Acid | 1 | 1 |
| Sulfur | 1.75 | 1.75 |
| SANTOCURE NS TBBS | 1 | 1 |

TBBS: N-Tertiarybutyl-2-benzothiazole-sulfenamide.

The tensile properties, vulcanization parameters (according to standard ASTM D5289: $M_H$, maximum torque; $t_{90}$, time in minutes needed to reach 90% of maximum torque) and dynamic properties of the resulting compounds (damping factor correlated to the rolling resistance and wet grip) are summarized in Table 8.

TABLE 8

| compound | $M_L$ (MU) | Shore A | $M_H$ (dN·m) | $t_{90}$ (min) | $E_{(300\%)}$ (MPa) | $\sigma_b$ (MPa) | $\epsilon_b$ (%) | Tg (°C.) | Tan δ RR | Tan δ WG |
|---|---|---|---|---|---|---|---|---|---|---|
| A | 55 | 60 | 14 | 15 | 14 | 27 | 510 | −33 | 100 | 100 |
| B | 48 | 59 | 13 | 10 | 17 | 26 | 420 | −34 | 105 | 101 |

The extension of the high styrene elastomeric base (SBR B) with the vegetable oil derivative a. according to Example 10 allows to prepare elastomeric compounds having a glass transition temperature comparable with that of the reference compound extended with RAE.

By comparing compounds A and B, in addition to a general improvement of mechanical properties and vulcanization parameters, an improved performance can be noted related to the predictiors commonly used for the estimation of wet grip and rolling resistance.

Example 16

An elastomeric composition containing a TDAE extender oil (Compound D) is compared to an elastomeric composition according to the invention (Compound C). The two elastomeric compositions comprise emulsion SBR (prepared in Examples 12-comparison and 11) with the same styrene content and carbon black.

Table 9 shows the quantities by weight in the elastomeric compositions in relation to one hundred parts of rubber (phr).

TABLE 9 quantities by weight (phr) in the elastomeric compositions of Example 16

| Material | Compound C | Compound D |
|---|---|---|
| SBR C | 100 | — |
| SBR D | — | 100 |
| HAF330 Carbon black | 50 | 50 |
| ZnO | 3 | 3 |
| Stearic Acid | 1 | 1 |
| Sulfur | 1.75 | 1.75 |
| SANTOCURE NS TBBS | 1 | 1 |

The tensile properties, vulcanization parameters and dynamic properties of the resulting compounds are summarized in Table 10.

TABLE 10

| compound | $M_L$ (MU) | Shore A | $M_H$ (dN·m) | $t_{90}$ (min) | $E_{(300\%)}$ (MPa) | $\sigma_b$ (MPa) | $\epsilon_b$ (%) | Tg (°C.) | Tan δ RR | Tan δ WG |
|---|---|---|---|---|---|---|---|---|---|---|
| C | 53 | 59 | 14 | 13 | 15 | 27 | 500 | −37 | 102 | 101 |
| D | 49 | 60 | 14 | 15 | 16 | 27 | 470 | −36 | 100 | 100 |

The extension of the high styrene elastomeric base (SBR C) with the vegetable oil derivative a. according to Example 11 allows to prepare elastomeric compounds having a glass transition temperature comparable with that of the reference compound extended with TDAE.

By comparing compounds C and D, an improved performance can be noted related to the predictiors commonly used for the estimation of wet grip and rolling resistance. The two elastomeric compounds show similar mechanical properties and vulcanization parameters.

Example 17

An elastomeric composition containing a RAE extender oil (Compound A) is compared to an elastomeric composition according to the invention (Compound B). The two elastomeric compositions comprise emulsion SBR (prepared in Examples 9-comparison and 10) with a different styrene content and silica with coupling reaction in mixer.

Table 11 shows the quantities by weight in the elastomeric compositions in relation to one hundred parts of rubber (phr).

TABLE 11 quantities by weight (phr) in the elastomeric compositions of Example 17

| Material | Compound A1 | Compound B1 |
|---|---|---|
| SBR A | 100 | — |
| SBR B | — | 100 |
| Ultrasil 7000 Silica | 55 | 55 |
| Si75 Silane | 4.4 | 4.4 |
| ZnO | 2.7 | 2.7 |
| ANOX HB | 1.5 | 1.5 |
| Stearic Acid | 1.5 | 1.5 |
| Sulfur | 1 | 1 |
| MBTS | 1.3 | 1.3 |
| DPG | 1.5 | 1.5 |

Anox HB refers to 2,2,4-trimethyl-1,2-dihydroquinoline polymer
MBTS: 2-Mercapto Benzo Thiazole Sulphate
DPG: diphenylguanidine.

The tensile properties, vulcanization parameters and dynamic properties of the resulting compounds are summarized in Table 12.

TABLE 12

| compound | $M_L$ (MU) | Shore A | $M_H$ (dN·m) | $t_{90}$ (min) | $E_{(300\%)}$ (MPa) | $\sigma_b$ (MPa) | $\epsilon_b$ (%) | Tg (°C.) | Tan δ RR | Tan δ WG |
|---|---|---|---|---|---|---|---|---|---|---|
| A1 | 52 | 63 | 15 | 5 | 12 | 31 | 580 | −33 | 100 | 100 |
| B1 | 55 | 63 | 14 | 13 | 13 | 26 | 510 | −34 | 106 | 105 |

Elastomeric Compound B1 according to the invention has a glass transition temperature comparable with that of the reference compound extended with RAE (A1) and an improved performance related to the predictors commonly used for the estimation of wet grip and rolling resistance.

The two elastomeric compounds show similar mechanical properties and vulcanization parameters.

Example 18

An elastomeric composition containing a RAE extender oil (Compound A) is compared to an elastomeric composition according to the invention (Compound B). The two elastomeric compositions comprise emulsion SBR (prepared in Examples 9-comparison and 10) with a different styrene content, high cis polybutadiene content (cis-BR) and silica with coupling reaction in mixer.

Table 13 shows the quantities by weight in the elastomeric compositions in relation to one hundred parts of rubber (phr).

TABLE 13

| quantities by weight (phr) in the elastomeric compositions of Example 18 | | |
|---|---|---|
| Material | Compound A2 | Compound B2 |
| SBR A | 75 | — |
| SBR B | — | 75 |
| cis-BR | 25 | 25 |
| Ultrasil 7000 Silica | 55 | 55 |
| Si75 Silane | 4.4 | 4.4 |
| ZnO | 2.7 | 2.7 |
| ANOX HB | 1.5 | 1.5 |
| Stearic Acid | 1.5 | 1.5 |
| Sulfur | 1 | 1 |
| MBTS | 1.3 | 1.3 |
| DPG | 1.5 | 1.5 |

The tensile properties, vulcanization parameters and dynamic properties of the resulting compounds are summarized in Table 14.

TABLE 14

| compound | $M_L$ (MU) | Shore A | $M_H$ (dN·m) | $t_{90}$ (min) | $E_{(300\%)}$ (MPa) | $\sigma_b$ (MPa) | $\epsilon_b$ (%) | Tg (°C.) | Tan δ RR | Tan δ WG |
|---|---|---|---|---|---|---|---|---|---|---|
| A2 | 76 | 65 | 19 | 4 | 11 | 26 | 530 | −44 | 100 | 100 |
| B2 | 69 | 63 | 18 | 5 | 12 | 23 | 500 | −26 | 110 | 116 |

Example 19

An elastomeric composition containing a TDAE extender oil (Compound F) is compared to an elastomeric composition containing a vegetable oil derivative according to the invention (Compound E). The two elastomeric compositions comprise solution SBR (prepared in Examples 14-comparison and 13) and silica with coupling reaction in mixer.

Table 15 shows the quantities by weight in the elastomeric compositions in relation to one hundred parts of rubber (phr).

TABLE 15

| quantities by weight (phr) in the elastomeric compositions of Example 19 | | |
|---|---|---|
| Material | Compound E1 | Compound F1 |
| SBR E | 100 | — |
| SBR F | — | 100 |
| Ultrasil 7000 Silica | 55 | 55 |
| Si75 Silane | 4.4 | 4.4 |
| ZnO | 2.7 | 2.7 |
| ANOX HB | 1.5 | 1.5 |
| Stearic Acid | 1.5 | 1.5 |
| Sulfur | 1 | 1 |
| MBTS | 1.3 | 1.3 |
| DPG | 1.5 | 1.5 |

The tensile properties, vulcanization parameters and dynamic properties of the resulting compounds are summarized in Table 16.

TABLE 16

| compound | $M_L$ (MU) | Shore A | $M_H$ (dN·m) | $t_{90}$ (min) | $E_{(300\%)}$ (MPa) | $\sigma_b$ (MPa) | $\epsilon_b$ (%) | Tg (°C.) | Tan δ RR | Tan δ WG |
|---|---|---|---|---|---|---|---|---|---|---|
| E1 | 88 | 69 | 23 | 16 | 12 | 17 | 280 | −12 | 106 | 105 |
| F1 | 96 | 66 | 22 | 14 | 11 | 16 | 260 | −13 | 100 | 100 |

The different styrene content of the base elastomers (SBR A and B) generates a different thermodynamic compatibility with high 1,4-cis polybutadiene (cis-BR). This determine a modification of the glass transition temperature of the compound with higher styrene content. Against comparable mechanical properties and vulcanization parameters, the resulting viscoelastic response favors the performance related to the predictors commonly used for the estimation of wet grip and rolling resistance.

Rubber compound E1 has a glass transition temperature comparable with that of the reference compound extended with TDAE (F1) and an improved performance related to the predictors commonly used for the estimation of wet grip and rolling resistance.

The two rubber compounds show similar mechanical properties and vulcanization parameters. The finding is of particular interest if compared to the lower Mooney torque of the elastomeric composition E with respect to F.

Example 20

An elastomeric composition containing a TDAE extender oil (Compound F) is compared to an elastomeric composition according to the invention (Compound E). The two elastomeric compositions comprise solution SBR (prepared in Examples 14-comparison and 13) with a different styrene content, high 1,4-cis polybutadiene content (cis-BR) and silica with coupling reaction in mixer.

Table 17 shows the quantities by weight in the elastomeric compositions in relation to one hundred parts of rubber (phr).

TABLE 17

| quantities by weight (phr) in the elastomeric compositions of Example 20 | | |
|---|---|---|
| Material | Compound E2 | Compound F2 |
| SBR E | 75 | — |
| SBR F | — | 75 |
| cis-BR | 25 | 25 |
| Ultrasil 7000 Silica | 55 | 55 |
| Si75 Silane | 4.4 | 4.4 |
| ZnO | 2.7 | 2.7 |
| ANOX HB | 1.5 | 1.5 |
| Stearic Acid | 1.5 | 1.5 |
| Sulfur | 1 | 1 |
| MBTS | 1.3 | 1.3 |
| DPG | 1.5 | 1.5 |

The tensile properties, vulcanization parameters and dynamic properties of the resulting compounds are summarized in Table 18.

TABLE 18

| compound | $M_L$ (MU) | Shore A | $M_H$ (dN·m) | $t_{90}$ (min) | $E_{(300\%)}$ (MPa) | $\sigma_b$ (MPa) | $\epsilon_b$ (%) | Tg (°C.) | Tan δ RR | Tan δ WG |
|---|---|---|---|---|---|---|---|---|---|---|
| E2 | 79 | 68 | 23 | 8 | 10 | 18 | 330 | −18 | 109 | 110 |
| F2 | 84 | 63 | 21 | 6 | 8 | 15 | 310 | −24 | 100 | 100 |

The different styrene content of the base elastomers (SBR E and F) generates a different thermodynamic compatibility with high 1,4-cis polybutadiene (cis-BR). This determine a different viscoelastic response of the compound with higher styrene content in the region of the glass transition temperature. This response results, in parallel with an improvement of mechanical properties and vulcanization parameters, in a superior performance related to the predictors commonly used for the estimation of wet grip and rolling resistance. The finding is of particular interest if compared to the lower Mooney torque of the elastomeric composition E with respect to F.

As can be noted comparing Tables 8, 10, 12, 14, 16 and 18, the extender oil according to the invention allows to obtain elastomeric compositions with:

comparable mechanical properties (even improved, see Table 8), comparable vulcanization parameters, improved performances linked to the predictors commonly used for the estimation of wet grip and, surprisingly, of rolling resistance when compared to traditionally oil extended elastomeric compositions having similar Tg values. This is evident even when they represent a minority component in a mixture with mineral extender oils (Table 10).

The invention claimed is:

1. An elastomer composition comprising:
   (i) at least one elastomer;
   (ii) from 5 to 75 phr of an extender oil comprising at least one of vegetable oil derivative selected from one or more of:
      a. mixture of triglycerides comprising one or more of the following oligomeric structures:

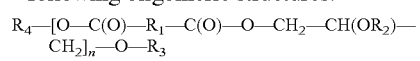

wherein
   $R_1$ is selected from $C_2$-$C_{22}$ alkylenes,
   $R_2$ is selected from one or more of the following groups consisting of $C_6$-$C_{24}$ dicarboxylic acid residues and $C_6$-$C_{24}$ monocarboxylic acid residues,
   $R_3$ is selected from one or more of the following groups consisting of H, $C_6$-$C_{24}$ dicarboxylic acid residues and $C_6$-$C_{24}$ monocarboxylic acid residues,
   $R_4$ is an alkyl group,
   n is an integer greater than or equal to 2,
   said $C_6$-$C_{24}$ dicarboxylic acid residues of $R_2$ and $R_3$ being esterified with monoalcohols and said mixture of triglycerides having a Numerical Average Molecular Weight (Mn) of between 800 and 10,000,
      b. triglycerides of one or more long chain carboxylic acids including at least one carboxylic acid containing adjacent hydroxyl groups,
      c. esters of polyols with at least a monocarboxylic acid and at least a dicarboxylic acid, the said esters being other than triglycerides;
   (iii) at least one selected from the group consisting of:
      from 10 to 150 phr of silica,
      from 10 to 150 phr of carbon black,
      from 0.1 to 10 phr of a vulcanizing agent.

2. The elastomer composition according to claim 1 comprising silica and coupling agents.

3. The elastomer composition according to claim 1 wherein said at least one elastomer is a natural rubber or a synthetic rubber.

4. The elastomer composition according to claim 3, wherein said at least one elastomer is a synthetic rubber selected from the group consisting of diene-based rubbers, thermoplastic elastomers, nitrile rubbers, acrylonitrile-butadiene copolymers (NBR) and styrene-isoprene-styrene (SIS) polar rubbers.

5. The elastomer composition according to claim 4, wherein said at least one elastomer is a diene-based rubber.

6. The elastomer composition according to claim 5, wherein said diene-based rubber is a vinylarene-conjugated diene copolymer.

7. The elastomer composition according to claim 6, wherein said vinylarene-conjugated diene copolymer is a styrene-1,3-butadiene random copolymer.

8. The elastomer composition according to claim 7, wherein said styrene-1,3-butadiene random copolymer has a styrene content from 15 to 50% by weight.

9. The elastomer composition according to claim 7, wherein said styrene-1,3-butadiene random copolymer has a vinyl unit content from 10 to 80% with respect to the diene content.

10. The elastomer composition according to claim 7, wherein said styrene-1,3-butadiene random copolymer is obtained from solution or as emulsion.

11. The elastomer composition according to claim 1, wherein the $R_1$ group of the vegetable oil derivatives of type (a) is $C_6$-$C_{11}$ alkylene.

12. The elastomer composition according to claim 1, wherein the $C_6$-$C_{24}$ dicarboxylic acid residues of $R_2$ and $R_3$ are suberic acid, azelaic acid and brassylic acid and their mixtures.

13. The elastomer composition according to claim 1, wherein the $R_4$ group of the vegetable oil derivatives of type (a) is a $C_1$-$C_{12}$ alkyl group.

14. The elastomer composition according to claim 1, wherein the vegetable oil derivatives of type (a) comprise dimer and/or trimer esters of triglycerides containing $C_6$-$C_{24}$ dicarboxylic acids residues.

15. The elastomer composition according to claim 1, wherein the vegetable oil derivative is of type (a).

16. The elastomer composition according to claim 1, wherein the extender oil comprises a mixture of at least a vegetable oil derivative with mineral and/or natural oils.

17. The elastomer composition according to claim 16, wherein said mixture contains 15-45% by weight of vegetable oil derivatives.

18. The elastomer composition according to claim 1 comprising one or more of the following ingredients: vulcanisation accelerators, activators, retardants, organic acids, antioxidants, fillers, process coadjuvants.

19. A rubber compound prepared from the elastomeric composition according to claim 1.

20. A tyre comprising the rubber compound according to claim 19.

* * * * *